United States Patent [19]

Takeuchi

[11] Patent Number: 5,298,349
[45] Date of Patent: Mar. 29, 1994

[54] METHOD OF PRETREATING A CATHODE FOR ATTAINING A STABLE VOLTAGE UPON CELL ASSEMBLY

[75] Inventor: Esther S. Takeuchi, Williamsville, N.Y.

[73] Assignee: Wilson Greatbatch, Ltd., Clarence, N.Y.

[21] Appl. No.: 844,220

[22] Filed: Mar. 2, 1992

[51] Int. Cl.$^5$ .............................................. H01M 4/00
[52] U.S. Cl. .................................. 429/219; 429/218; 423/593
[58] Field of Search ................ 429/218, 219; 423/593

[56] References Cited

U.S. PATENT DOCUMENTS

| | | | |
|---|---|---|---|
| 3,933,688 | 1/1976 | Dines | 423/508 |
| 4,391,729 | 7/1983 | Liang et al. | 429/194 |
| 4,731,307 | 3/1988 | Guidotti | 429/112 |
| 4,761,487 | 8/1988 | Godshall | 429/112 |
| 4,964,877 | 10/1990 | Keister et al. | 29/623.1 |

OTHER PUBLICATIONS

Takeuchi et al., "Lithium/Silver Vanadium Oxide Batteries with Various Silver to Vanadium Ratios," J. Power Sources 21(1987) pp. 131–141.
Whittingham et al. "n-Butyllithium-an Effective General Cathode Screening Agent", J. Electro Chem. Soc. 124(1977)1387.

*Primary Examiner*—Olik Chaudhuri
*Assistant Examiner*—C. Everhart
*Attorney, Agent, or Firm*—Hodgson, Russ, Andrews, Woods & Goodyear

[57] ABSTRACT

A chemical pretreatment method for inserting lithium into cathode active material silver vanadium oxide to provide a reduced form of silver vanadium oxide which, when included into a cathode mixture and incorporated into an electrochemical cell, may result in a cell with a lowered initial open circuit voltage, thereby eliminating the need to lower unstably high initial cell voltages through external loads after cell construction.

6 Claims, 2 Drawing Sheets

METHOD OF PRETREATING A CATHODE FOR ATTAINING A STABLE VOLTAGE UPON CELL ASSEMBLY

BACKGROUND OF THE INVENTION

1. Field of the Invention

This invention relates to the manufacture of an electrochemical cell or battery, and more particularly to a method of manufacture thereof to attain an acceptable and stable voltage upon cell assembly.

2. Discussion of the Prior Art

A solid cathode liquid organic electrolyte lithium anode cell or battery has been used as the power source for implantable medical devices. The cathode of such a cell, or other alkali metal anode battery or cell, may have as active material carbon fluoride, a metal oxide, a metal oxide bronze such as silver vanadium oxide, or other suitable material as disclosed in U.S. Pat. No. 4,830,940 by Keister et al, which patent is assigned to the assignee of the present invention and which patent is incorporated herein by reference.

Typically, cells containing cathode active material such as metal oxide, mixed metal oxides, or metal oxide bronze, may when first assembled, display a high voltage which is not stable over time. For example, the voltage of a cell containing the metal oxide bronze silver vanadium oxide as the cathode active material, may degrade from an initial 3.6 or 3.7 volts before reaching a stable voltage of 3.25 volts. This degradation may lead to increased self-discharge in cells resulting in decreased service life, and/or decreased performance under some low rate discharge conditions. In order to avoid these problems, such cells have been placed on load shortly after assembly in order to discharge the high voltage portion of the cells' capacity. However, this practice of discharging the cells after assembly undesirably results in scheduling difficulties in cell production, since every newly constructed cell must be treated promptly, and also results in additional expense for discharging the high voltage portion of each cell's capacity.

OBJECTS OF THE INVENTION

It is accordingly an object of the present invention to manufacture electrochemical cells in such a way that the step of lowering their voltages by the use of external loads after cell construction may be eliminated.

In accordance with the present invention, the cathode active material is pretreated, prior to assembly, with a compound capable of inserting a lithium species. Insertion of a lithium species, known in the art as lithiation, into silver vanadium oxide is done so that a newly assembled cell may exhibit the desired stable lowered open circuit voltage whereby the step of lowering its voltage by the use of an external load after cell construction may be eliminated.

The cathode active material comprising silver vanadium oxide is preferably lithiated to a final level of between 1 and 3 percent of the maximum for the material wherein the lithiated cathode active material is represented by the formula:

$$Li_xAg_yV_2O_z$$

wherein $0.02 \leq x \leq 0.10$, $0.5 \leq y \leq 2.0$, and $4.5 \leq z \leq 6.0$ Alkyl lithium materials have been used for the lithiation of metal oxides and cathode materials (see, for example, U.S. Pat. Nos. 3,956,194; 4,041,220; 4,770,960; and 4,497,726) under circumstances which would not teach or suggest the use of a lithium species, as used in accordance with the present invention, to lithiate cathode active materials comprising silver vanadium oxide so that the newly assembled cell may exhibit a lowered open circuit voltage whereby the step of lowering its voltage by the use of an external load after cell construction may be eliminated. Other patents which may be of general interest include U.S. Pat. Nos. 4,310,609; 4,654,280; 4,686,161; 4,728,590; 4,803,137; and 4,830,940.

BRIEF DESCRIPTION OF THE DRAWINGS

The above and other objects, features, and advantages of the present invention will be apparent in the following detailed description of the preferred embodiments taken in conjunction with the accompanying drawings, in which.

DETAILED DESCRIPTION OF THE PREFERRED EMBODIMENTS

Figure 1:
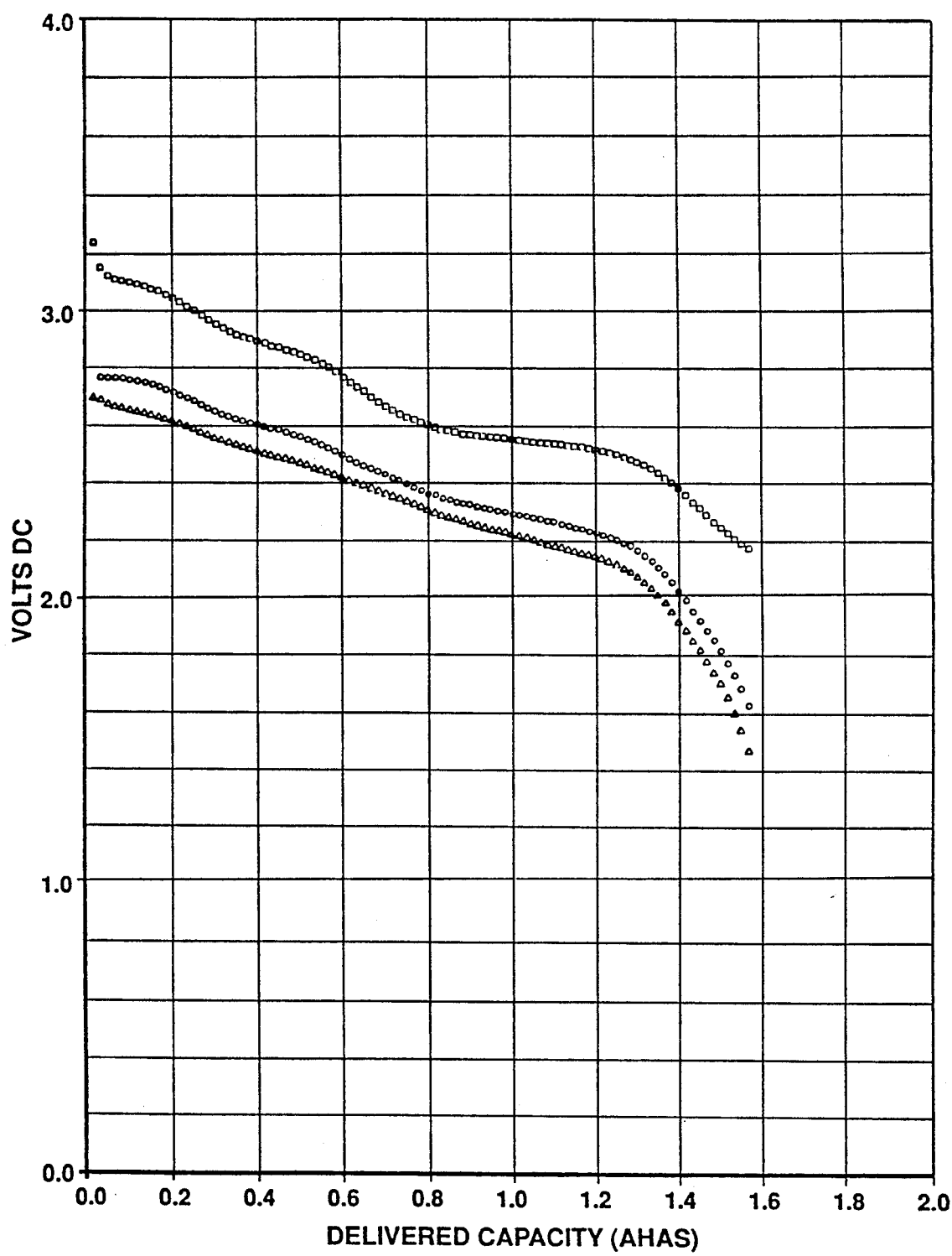
FIG. 1 is a graph showing the discharging of a newly assembled electrochemical cell following discharge of the high voltage portion of the cell's capacity through external load in accordance with the prior art.

The cathode active material treated by the method of the present invention can be used in a nonaqueous lithium battery as described by Keister et al, wherein the battery also contains an alkali metal anode, preferably lithium, or alloys thereof; a nonaqueous electrolyte which preferably is comprised of a combination of lithium salt and an organic solvent; and a separator material electrically insulating the anode from the cathode yet sufficiently porous to allow for electrolyte flow. In order to lower the open circuit voltage to a point wherein the electrolyte will not degrade so that the step of lowering the cell voltage by the use of an external load after cell construction may desirably be eliminated, in accordance with the present invention the cathode active material silver vanadium oxide is modified by introducing lithium into the material. The chemically pretreated cathode active material resulting from such lithiation is preferably represented by the formula:

$$Li_xAg_yV_2O_z$$

wherein $0.02 \leq x \leq 0.10$, $0.5 \leq y \leq 2.0$, and $4.5 \leq z \leq 6.0$ In the formula, the more preferable range of x is from about 0.035 to 0.070; the more preferable range of y is from about 0.95 to about 1.1; and the more preferable range of z is from about 5.0 to about 6.0.

The chemical pretreatment can be accomplished by reducing silver vanadium oxide using an organic lithiating agent such as n-butyl lithium, in the presence of a nonprotic organic solvent such as hexane. However, the introduction of lithium may be accomplished using an organic lithiating agent in liquid form without the presence of additional solvent. The object of such chemical pretreatment is to introduce lithium into the compound, said introduction being known as lithiation. Several methods can be used to achieve lithiation and include, but are not limited to: 1) Fully lithiating a portion of the silver vanadium oxide, as represented by the formula $Li_{3.5}Ag_yV_2O_z$, and combining it with unlithiated silver vanadium oxide wherein the final level of lithiation of the battery cathode active material is represented by the formula $Li_{0.035-0.070}AgV_2O_{5.5}$. 2) Partially lithiating the entire sample of silver vanadium oxide needed for a cathode by the addition of the requisite amount of an organic lithiating agent wherein preferably from about 1 percent to about 2 percent of the entire sample is lithiated, and the final level of the lithiation is between 1 percent and 3 percent of the maximum for the material resulting in a formula of $Li_{0.035-0.070}AgV_2O_{5.5}$.

A newly assembled cell is provided to contain cathode active material prepared in accordance with the present invention, so that a cell exhibits a voltage that is within acceptable voltage limits, wherein the predischarge step of lowering the cell voltage through external load may become unnecessary.

EXAMPLE 1

Chemical pretreatment of cathode active material was performed by fully lithiating a portion of the silver vanadium oxide needed for a battery cathode. A 1.0 g sample of silver vanadium oxide was fully lithiated by allowing it to react with 7.5 ml of 1.6M n-butyl lithium in hexane. The mixture was allowed to incubate for 5 days at 20°-25° C. after which the silver vanadium oxide was isolated by filtration, and then dried. A cathode mixture was prepared by adding 0.20 g portion of the dried reduced silver vanadium oxide to 10.0 g of untreated silver vanadium oxide, and to binder and conductor materials comprising 0.32 g of Teflon 7A, 0.21 g of graphite powder and 0.11 g of Ketjenblack carbon. In this illustrative example, the cathode mix preferably comprises 92.2 weight percent $AgV_2O_{5.5}$, 1.8 weight percent $Li_{3.5}AgV_2O_{5.5}$, three weight percent Teflon powder, two weight percent graphite powder, and one weight percent carbon. The cathode mixture was homogenized with a mortar and pestle and then formed into a plate by pressing 1.0 g of the mixture to a suitable current collector.

Battery cells were assembled, in a manner as described by Keister et al, using the foregoing lithiated cathode. The liquid electrolyte introduced into the cells comprised a 1 Molar solution of $LiAsF_6$ in a 1:1 volume:volume propylene carbonate/dimethoxyethane vs $Li/Li^+$. Typical initial open circuit voltages of cells containing the same electrolyte, and cathode material comprising untreated silver vanadium oxide are 3.6 to 3.7V, which require discharge by external load to attain a stable 3.25 volts. Cells containing the cathodes prepared by the method of the present invention had initial open circuit voltages of 3.18 to 3.19V. The voltages stabilized at 3.27V and remained stable during 440 days of storage at 37° C., thus desirably not requiring external load stabilization.

The discharge behaviors of the cell of the present example, and of conventional cells discharged by use of an external load after cell construction, were observed. The self-discharge of the cells was estimated from heat dissipated as measured by calorimetry. The annual self-discharge rates for cells of the present example, and for conventional cells containing untreated cathode active material, was estimated for both to be 0.8 to 1.2 percent per year.

Figure 2:
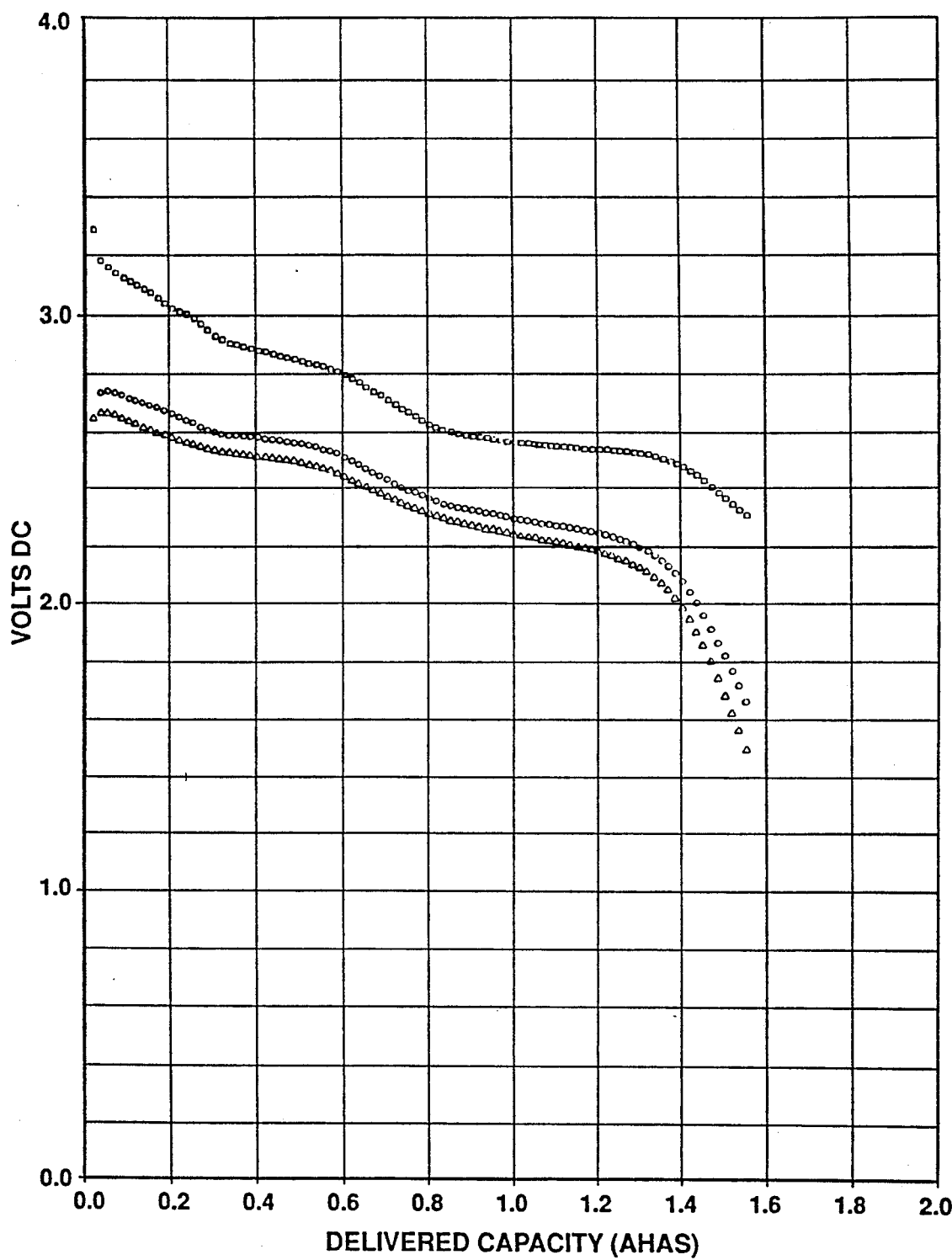
FIG. 2 is a graph showing the discharging curve of a newly assembled electrochemical cell containing a cathode which was pretreated in accordance with the invention.

The performance of the cells containing cathode active material lithiated in accordance with the present invention, as described above, was compared to the performance of otherwise identical cells containing untreated cathode material. Typical discharge curves of cells discharged by use of an external load after cell construction, in accordance with the prior art, are shown in FIG. 1 (□-1st OC, O-Pulse 1 minute, Δ-Pulse 4 minute). Typical discharge curves of cells containing cathode material treated in accordance with the present invention are shown in FIG. 2, (□-1st OC, O-Pulse 1 minute, Δ-Pulse 4 minutes). Comparison of the data indicates that both cell types share similar discharge properties. Discharge testing of the cells of the present example after the storage period indicated little or no capacity loss.

A cathode is pretreated by lithiation and incorporated into an electrochemical cell, in accordance with the present invention so that the cell voltage may already be at an acceptable level on cell assembly. The present invention addresses a problem involving the need to predischarge each newly assembled cell to avoid detrimental effects, such as decreased service life or decreased performance, caused by the cell's initial unstable high voltage. The method described herein is thus provided to eliminate the need for the predischarge step, required of cells having an initial unstable high voltage, so that scheduling difficulties in cell production may be avoided, and associated production expenses reduced.

The above detailed description and examples are intended for purposes of illustrating the invention and are not to be construed as limiting. The invention can be embodied otherwise without departing from the principles thereof, and such other embodiments are meant to come within the scope of the present invention as defined by the appended claims.

What is claimed is:

1. A process for constructing an electrochemical cell wherein the need to discharge the high voltage portion of the cell's capacity after assembly is obviated, said process comprises: (a) chemically pretreating the cathode prior to cell assembly, wherein the active material of the cathode comprises silver vanadium oxide, by contacting the active material with a compound capable of inserting a lithium species into the active material resulting in a treated cathode active material represented by the formula:

$$Li_xAg_yV_2O_z$$

where x has a value between 0.02 and 0.10, y has a value between 0.5 and 2.0, and z has a value between 4.5 and 6.0.

2. The process according to claim 1, wherein the treated cathode active material is represented by the formula:

$$Li_{0.035}AgV_2O_{5.5}$$

3. The process of claim 2, wherein the compound capable of inserting a lithium species comprises an organic lithiating agent.

4. The process of claim 3, further comprising selecting the organic lithiating agent to be n-butyl lithium.

5. A cathode comprising lithiated silver vanadium oxide as the cathode active material, and further comprising binder and conductor materials, wherein the cathode comprises about 92.2 weight percent $AgV_2O_{5.5}$ about 1.8 weight percent $Li_{3.5}AgV_2O_{5.5}$; about 3 weight percent Teflon powder; about 2 weight percent graphite powder, and about 1 weight percent carbon.

6. An electrochemical cell produced according to the process of claim 2, said cell further comprising an anode comprised of lithium, an electrolyte comprised of a solution of 1M $LiAsF_6$ as a lithium salt and 1:1 volume:-volume mixture of propylene carbonate/dimethoxyethane as an organic solvent, wherein when newly assembled, said said cell has an initial open circuit voltage of about 3.1 to 3.3V.

* * * * *